(No Model.)
B. BEAUPRE.
JOURNAL BEARING.
No. 448,196. Patented Mar. 17, 1891.
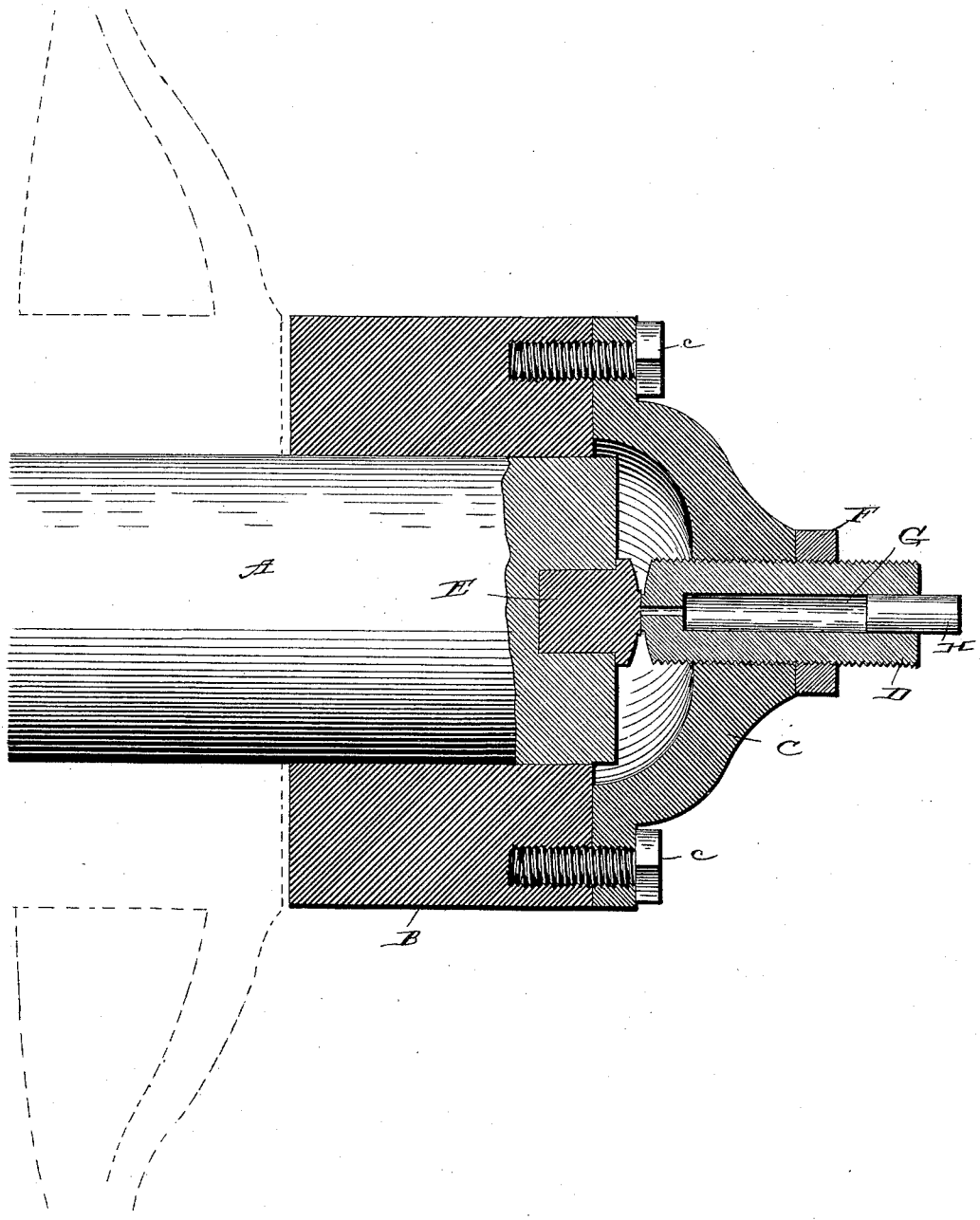
Witnesses
E. L. Smith
Thomas Durant
Inventor
Bruno Beaupré,
By his Attorneys
Louis Werser & Co.

UNITED STATES PATENT OFFICE.

BRUNO BEAUPRE, OF ST. PAUL, MINNESOTA.

JOURNAL-BEARING.

SPECIFICATION forming part of Letters Patent No. 448,196, dated March 17, 1891.

Application filed July 18, 1890. Serial No. 359,155. (No model.)

*To all whom it may concern:*

Be it known that I, BRUNO BEAUPRE, of St. Paul, in the county of Ramsey and State of Minnesota, have invented certain new and useful Improvements in Journal-Bearings; and I do hereby declare the following to be a full, clear, and exact description of the same, reference being had to the accompanying drawing, forming a part of this specification, and to the letters of reference marked thereon.

This invention relates to improvements in journal-bearings, and has for its objects to provide a collarless journal in which all false or wabbling motion is prevented and the friction incident to such motion reduced to a minimum.

The accompanying figure of drawing represents a section through a journal-bearing and journal of a horizontal shaft, such as the axle of a railroad-car.

The letter A indicates the axle or shaft forming the journal, which is preferably smooth and regular—that is to say, it is minus the ordinary collar or collars.

B indicates the journal-box, in which the journal revolves; C, a cap secured to the face of the box by screws $c$ or other suitable means, the cap being made to cover the entire end of the journal so as to exclude dust, dirt, &c. Through the cap C is screwed a bumper D, which engages a corresponding bumper E, inserted in the end of the journal A, and takes up all lateral thrust of the same. The bumpers are preferably made of steel, and with their contacting surfaces relatively small, so as to present as small a surface as possible for friction, and are furthermore made so as to be readily removed for the insertion of new bumpers should occasion require.

F indicates a jam-nut on bumper D to hold the latter fast in set position, and G represents a central cavity in bumper D, having a small opening in the bearing-surface to supply lubricant thereto, and an external opening through which lubricant may be introduced into the cavity, with means—such as a plug H—for closing the same.

By forming the axle or shaft without a collar it is rendered very much stronger and is subject to very much less friction. The friction due to the lateral thrust of the shaft is all between the small contacting faces of the hardened-steel bumpers, and therefore practically amounts to nothing.

The axle or shaft can be used on an ordinary lubricated journal, anti-friction journal, or any journal for stationary machinery or railroad purposes.

What I claim as new, and desire to secure by Letters Patent, is—

The combination, with the collarless axle or shaft having a bumper removably secured in its end, of the bearing surrounding the shaft, a cap removably secured to the bearing and entirely inclosing the end of the shaft, the chambered bumper screwing through the cap and engaging the bumper in the end of the shaft, and having an oil-passage leading from the chamber to its working-face, and a locking-nut for holding the bumper in adjusted position, substantially as described.

In testimony whereof I have hereunto set my hand in presence of two subscribing witnesses.

BRUNO BEAUPRE.

Witnesses:
FRANK A. ELDREDGE,
WM. NEWTON.